United States Patent [19]
Juhlin et al.

[11] 3,962,625
[45] June 8, 1976

[54] CONVERTOR STATION WITH PARALLEL-CONNECTED STATIC CONVERTORS

[75] Inventors: Lars-Erik Juhlin; Gote Liss, both of Ludvika, Sweden

[73] Assignee: Allmanna Svenska Elektriska Aktiebolaget, Vasteras, Sweden

[22] Filed: June 19, 1974

[21] Appl. No.: 480,930

[30] Foreign Application Priority Data
June 26, 1973  Sweden............................ 7308925

[52] U.S. Cl.................................. 321/27 R; 321/14
[51] Int. Cl.²......................................... H02M 7/00
[58] Field of Search...................... 321/14, 26, 27 R; 307/58

[56] References Cited
UNITED STATES PATENTS

| | | | |
|---|---|---|---|
| 1,846,895 | 2/1932 | Muller................................ | 321/27 R |
| 2,807,771 | 9/1957 | Winograd ............................ | 321/14 |
| 3,447,063 | 5/1969 | Hammarlund ....................... | 321/27 R |
| 3,549,977 | 12/1970 | Watkins............................. | 321/27 R |
| 3,746,967 | 7/1973 | Koltuniak et al. ................. | 321/27 R |
| 3,821,629 | 6/1974 | Liss.................................. | 321/27 R |

Primary Examiner—William M. Shoop

[57] ABSTRACT

In a convertor station for connecting a high voltage DC line and an AC network, the station is composed of a plurality of static convertors parallel connected on the DC and AC sides and a regulator for setting a predetermined transmission magnitude between the DC and AC sides of the station. Each static convertor has a separate regulating circuit connected to the regulator for the station. Limiting circuits are provided in parallel with each other and each connected to one of the regulating circuits, the limiting circuits being connected to the output side of the regulator. The output sides of the limiting circuits are each connected to one of the regulating circuits, and are all of them connected to a common summation device which feeds back the summation signal from the limiting circuits to the input side of the regulator.

1 Claim, 1 Drawing Figure

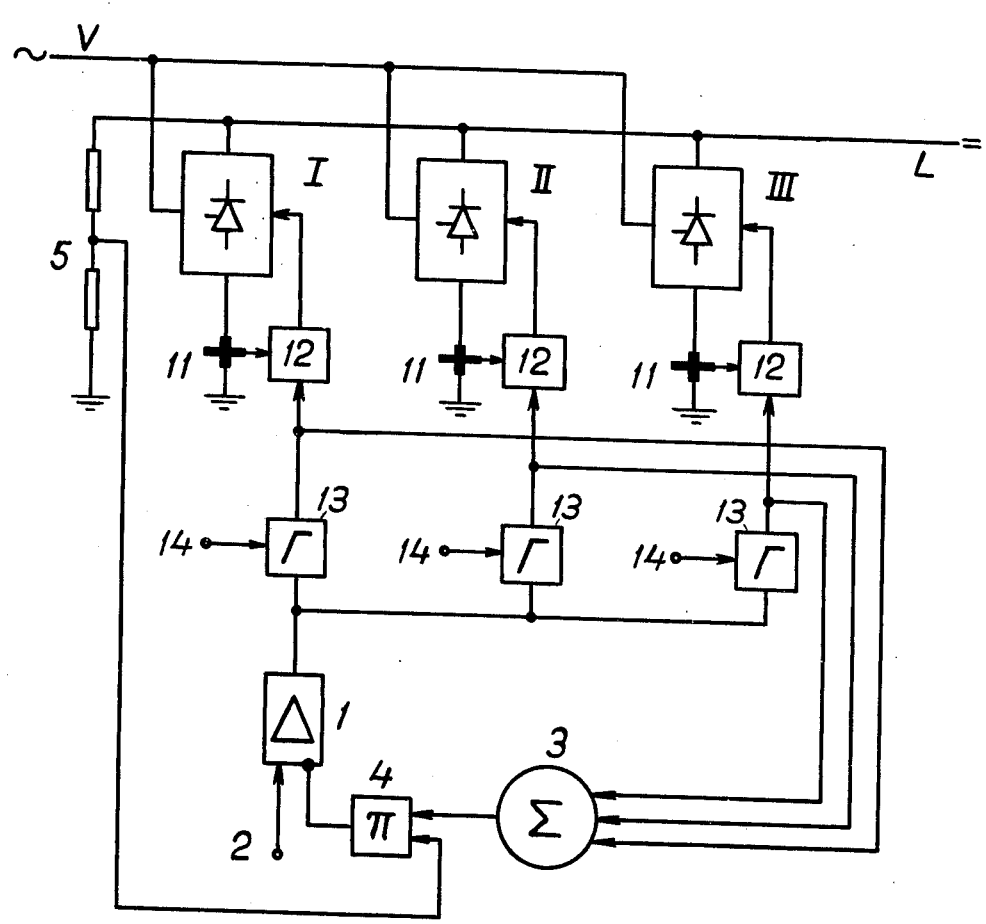

CONVERTOR STATION WITH PARALLEL-CONNECTED STATIC CONVERTORS

BACKGROUND OF THE INVENTION

1. Field of the Invention

The present invention relates to a convertor station for connection of a high-voltage DC line and an AC network, said station comprising a number of static convertors which are parallel-connected on the DC side as well as on the AC side. The station is provided with a regulator for setting a certain transmission magnitude between the DC and AC sides of the station, and each static convertor is provided with its own regulating circuit connected between said regulator and the proper static convertor, which is thus controlled from the regulator of the station.

2. The Prior Art

Such a convertor station occurs in DC power transmissions between different AC networks, each AC network being connected to the high-voltage DC line by way of a convertor station. To obtain the desired transmitted power it is common for each station to comprise several static convertors, the AC sides of which normally are connected in parallel with the AC network of the station, whereas the DC sides of the static convertors may be connected to the DC line in series or in parallel with each other. The present invention relates to the latter case and, as mentioned, the station is controlled by a regulator which normally receives a control order from a superior control system for the whole transmission for control of the load of the various stations.

In the case of parallel-connected convertors in one station, certain conditions should be fulfilled, the first condition being that the current order should normally be the same to all parallel convertors, while at the same time it should be possible to reduce the current order of a convertor to zero in order that the convertor may be disconnected. Furthermore, the total current order for the station and thus the actual current of the station should be independent of the fact that a convertor is disconnected.

SUMMARY OF THE INVENTION

According to the invention this is achieved by providing each of the regulating circuits for the different convertors with a limiting circuit at the input side for setting the maximally allowed or desired load of the convertor, the output side of this limiting circuit being connected to the regulating circuit as well as to a common summation device for feeding back the summation signal from the limiting circuits to the input side of the regulator. In this way, agreement is brought about between the control order coming from outside and the summation order which the converters receive from the common regulator.

The limiting circuits are preferably adjustable between the limit values zero and the maximally allowed load of the relevant convertor, that is, each limiting circuit is set at one of these limit values. Normally all the convertors in a station are alike, so that it is desirable to obtain a uniform distribution of the load among all the convertors which are in operation.

Further, the superior control system should consider the number of operating convertors in a station so that, if the maximally allowed total power in the station is less than the control order intended for the station, this control order is reduced correspondingly.

BRIEF DESCRIPTION OF THE DRAWINGS

In other respects the invention will be described more fully with reference to the accompanying drawing which shows a convertor station according to the invention.

DESCRIPTION OF THE PREFERRED EMBODIMENTS

The station connects an AC network V and a DC line L, which, in turn, is connected to one or more convertor stations, at least one station working as a rectifier and at least one as an inverter.

The shown station comprises three converters I – III which are connected in parallel on the DC side as well as on the AC side. Each convertor comprises a convertor transformer and a rectifier bridge which have not been shown in detail. One of the poles of each of the convertors is connected to the DC line L and the other pole to earth. In the earth connection there is a transductor 11 for measuring the direct current of the convertor. The transductor 11 is connected to a current regulating circuit 12 which, for example, may be of the type shown in U.S. Pat. No. 3,551,778, the convertor thus being controlled with respect to a certain desired direct current.

The desired value of this direct current is obtained from the common regulator 1 of the station, which, on one of its inpts 2, receives a control signal from a control system (not shown) for all the convertor stations connected to the DC line L. By means of the signal on the input 2 a desired value of a certain transmission magnitude in the station, and thus its desired load, is indicated. In the present case it has been assumed that the signal to 2 indicates the desired transmission power for the station.

The signal from the regulator 1 is connected in parallel to the regulating circuits 12 for all convertors through limiting circuits 13, thus giving all convertors the same current order. To ensure that this current order is correct, the output signals from the limiting circuits 13 are fed back to a summation circuit 3, the summation signal from which is fed to one input of a multiplicator circuit 4. Its other input is fed to a voltage divider 5 which is connected to the DC line L, so the output signal from the multiplicator circuit 4 will correspond to the total power of the station.

The limiting circuits 13 are each provided with a control input 14 so that the relevant circuit can be set at the limit value zero or the maximally allowed load on the corresponding convertor. Disconnection of a convertor is therefore quite simply performed by setting the corresponding limiting circuit 13 at zero. At the same time a signal on the input of the summator 3 will then be discontinued, so that the output signal from 3 and accordingly also from 4 is reduced by a degree corresponding to the signal from one convertor. This increases the input difference on the regulator 1, the output signal of which increases, so that the current in the remaining convertors in the station is raised. If the proper convertor is then to be connected again, this is performed by setting its limiting circuit 13 at the upper limit value, the signal from the regulator 1 then passing through the regulating circuit 12 so that the current of the convertor is increased. At the same time the summation signal at 3 and 4 increases, the regulator 1 thus reducing its output signal so that the desired summation current for the whole station is obtained.

Since all the convertors have the same current order a uniform distribution of the load between them is obtained.

To achieve a smooth transition during the connection and disconnection of a convertor, the switching of the limiting circuits 13 is suitably performed with a certan time constant or rate. Through the feedback over 3 and 4, it is ensured that the summation current for the whole station is held constant during the whole switching operation so that the transfer of the load current between one convertor and the other convertors is made continuously.

The inputs 14 on the limiting circuits 13 are suitably connected to the necessary safety circuits for the proper convertor, and said time constant should then be low. In addition to this, these inputs are suitable connected to the main control system (not shown) for all convertors, so that the limiting circuits can be used for disconnection and connection of the individual convertors as well as of the whole station from the outside.

When one station is to be connected, the individual convertors are prepared in conventional manner by being connected to DC and AC networks and by setting and activating the various control circuits. The regulating circuit 12 is preferably set in readiness at the maximum control angle to avoid violent current rushes due to the connection. Further, the tap changers of the different convertor transformers should be equally set in order to have the same voltage in all convertors. After that the limiting circuits are released one at a time, and because they are connected in parallel with the regulator 1 the load will be equally distributed among the connected convertors. When a station is to be disconnected, the limiting circuits are set to zero one at a time.

If the input signal on 2 exceeds the total allowed load on the convertors which are connected, the limiting circuits 13 will ensure that the connected convertors do not receive a greater current order than what corresponds to their rate current or allowed maximum current. This means that the signal from 3 through 4 is permanently lower than the input signal on 2. Even if this is less important for the station in question, it may cause a disturbance in the control system for the whole DC transmission. Therefore the number of connected and disconnected convertors should be indicated and imparted to the main control system, so that the control orders to the various stations can be mutually adjusted in relation to their load capacity.

We claim:

1. Convertor station for connection of a high-voltage DC line (L) and an AC network (V), which station comprises a plurality of static convertors (I-III) parallel-connected on the DC and AC sides, and a regulator (1) for setting a predetermined transmission magnitude between the DC and AC sides of the station, each static convertor having a separate regulating circuit (12) connected to said regulator (1) for the station, each regulating circuit (12) at the input side being provided with a limiting circuit (13), the input sides of the limiting circuits being parallel-connected and connected to the output side of the regulator (1), the output sides of the limiting circuits each being connected to one of the regulating circuits (12) of the static convertor, a common summation device (3) connected to the output sides of the limiting circuits, and including means for feeding back the summation signal from the limiting circuits to the input side of the regulator (1).

* * * * *